United States Patent
Togawa

(10) Patent No.: US 8,160,637 B2
(45) Date of Patent: Apr. 17, 2012

(54) INPUT MANAGEMENT IN A MOBILE TERMINAL DEVICE

(75) Inventor: Masamichi Togawa, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 608 days.

(21) Appl. No.: 12/325,358

(22) Filed: Dec. 1, 2008

(65) Prior Publication Data

US 2009/0247232 A1    Oct. 1, 2009

(30) Foreign Application Priority Data

Mar. 25, 2008    (JP) ................ P2008-077439

(51) Int. Cl.
*H04M 1/00*    (2006.01)
(52) U.S. Cl. ............... 455/550.1; 455/566; 345/172; 345/173
(58) Field of Classification Search ............... 455/550.1, 455/566; 345/172, 173
See application file for complete search history.

(56) References Cited

U.S. PATENT DOCUMENTS

2009/0227294 A1*  9/2009  Ouchi et al. ............ 455/566

FOREIGN PATENT DOCUMENTS

JP    2006-011557 A    1/2006
JP    2006-172104 A    6/2006

OTHER PUBLICATIONS

Japanese Office Action dated Feb. 7, 2012 as received in application No. 2008-077439.

* cited by examiner

*Primary Examiner* — Lincoln Donovan
*Assistant Examiner* — John Poos
(74) *Attorney, Agent, or Firm* — Maschoff Gilmore & Israelsen

(57) ABSTRACT

A mobile terminal device includes an input unit, an input detection unit for detecting input information at a predetermined interval from starting to the end of the input reception, and an application control unit which allows the application to execute the process preliminarily allocated corresponding to the input information upon reception of the input information detected by the input detection unit. The application control unit allows the application to execute the preliminarily allocated process corresponding to the input information indicating the end of the input reception when the input information before elapse of the predetermined time is not received, and generates the signal indicating the end of the input reception for transmission to the input detection unit to finish input information detection.

8 Claims, 5 Drawing Sheets

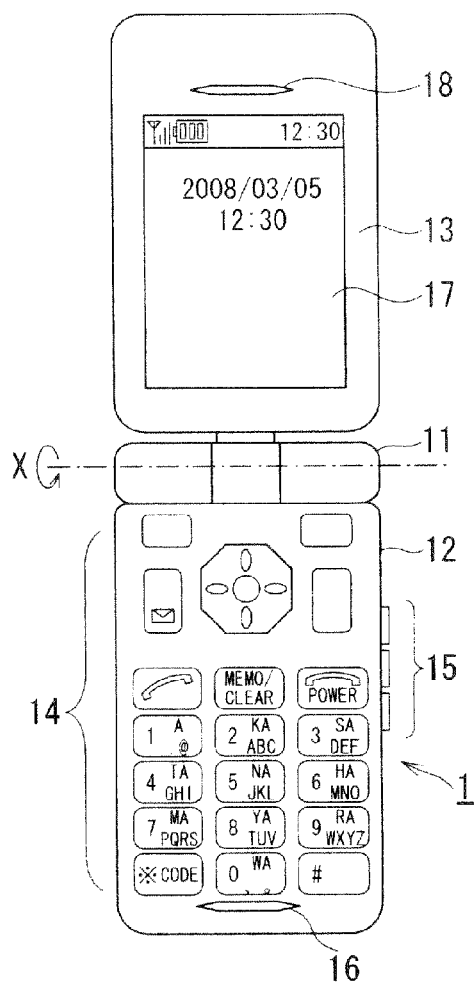
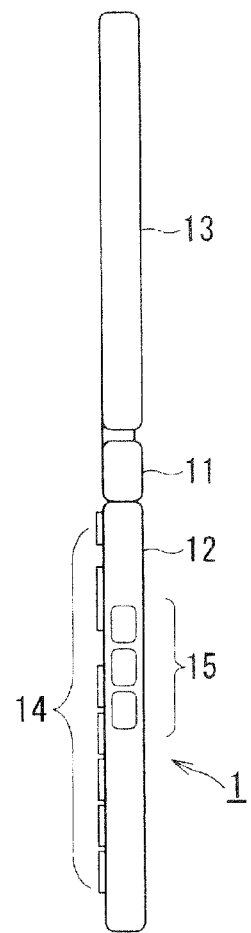
FIG. 1A  FIG. 1B
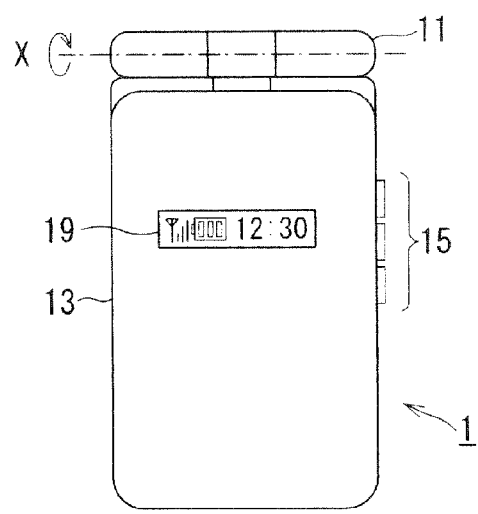
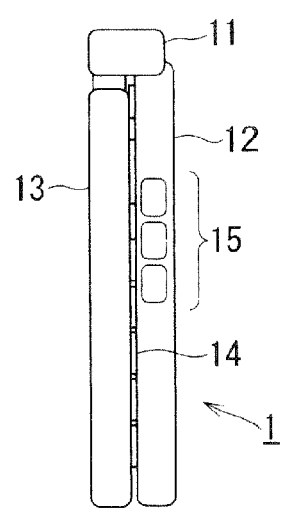
FIG. 2A  FIG. 2B

FIG. 5A

| APPLICATION | STANDBY | WEB BROWSER | MAIL | CAMERA | ..... | ○○ |
|---|---|---|---|---|---|---|
| INPROPER OPERATION DETECTION TIME | 10 | 30 | 30 | 10 | ..... | 15 |

FIG. 5B

| KEY | MENU KEY | ↑↓← → | NUMBER KEY | ..... | ××KEY |
|---|---|---|---|---|---|
| INPROPER OPERATION DETECTION TIME | 10 | 30 | 15 | ..... | 10 |

| DISPLAY SCREEN | START-UP SCREEN | HOMEPAGE SCREEN | CONNECTION SCREEN | . . . . | △△ SCREEN |
|---|---|---|---|---|---|
| INPROPER OPERATION DETECTION TIME | 10 | 30 | 10 | . . . . | 20 |

INPUT MANAGEMENT IN A MOBILE TERMINAL DEVICE

BACKGROUND OF THE INVENTION

1. Field of the Invention

The present invention relates to a mobile terminal device, and particularly to a mobile terminal device for appropriately coping with the improper operation of the input unit.

2. Related Art

Generally, a mobile terminal device such as a mobile phone includes an input unit with at least one operation key serving as input means. Each operation key has an allocated function executed when the operation key is depressed. Different input states may be set in accordance with the duration of the depression, for example, "short depression" and "long depression" such that the different process is allocated depending on the input state.

The input state of the input unit is identified by detecting the state of presence/absence of the input at a predetermined interval after the mobile terminal device receives the input. For example, when the input state is the "short depression", the number of times of continuous input detection is smaller than a predetermined value. On the other hand, when the input state is the "long depression", the number of times of the continuous input detection is larger than that of the "short depression".

Upon detection of the "long depression" input state, the number of times of detection at the predetermined interval by the mobile terminal device increases. Accordingly, power consumed by the mobile terminal device also increases accompanied with the detection. This may influence the continuous operating time of the mobile terminal device.

Japanese Unexamined Patent Application Publication No. 2006-11557 discloses an input control method and an information processing device for reducing power consumption accompanied with the detection. With the input control method and the information processing device, the detection interval of the input unit is arbitrarily changed so as to reduce the power consumption. In the case where the information processing device in the user's bag is accidentally operated to keep the operation key depressed, the mobile terminal device will execute the detection with respect to presence/absence of the input repeatedly at the predetermined intervals.

In order to cope with such accidental operation, the above-described related art provides a structure for prolonging the detection interval to reduce the number of times for performing the detection when the input state is detected by predetermined number of times or more, and it is determined as the "long depression" state.

The related art is structured to reduce the number of times for performing the detection with respect to the "long depression" input state so as to reduce the power consumption. In the case where the input state of the "long depression" is continued owing to the improper operation, the number of times for performing the detection may be reduced. However, the mobile terminal device is expected to continuously perform the detection and to execute the predetermined process allocated to the depressed operation key, and the "long depression" input state until the improper operation is canceled. The power consumed by performing the aforementioned processes is supposed to be unnecessary under normal circumstances, which should be avoided for the use of the mobile terminal device required to prolong the continuous operating time with the limited power.

SUMMARY OF THE INVENTION

The present invention was conceived in consideration of the circumstances mentioned above and an object thereof is to provide a mobile terminal device which executes detection of the input state of the input unit and suitably performs controlling in accordance with the input state so as to reduce the power consumption.

The above and other objects can be achieved according to the present invention by providing a mobile terminal device which includes: an input unit that receives an input through a key; an input detection unit activated at a time when the input unit receives the input through the key to detect input information data including the input received by the input unit until end of the input reception by the input unit; an application control unit that receives the input information data detected by the input detection unit to allow an application program to perform a process preliminarily allocated corresponding to the input information; and a timer that counts a predetermined set time, wherein the application control unit allows the timer to count a predetermined time upon reception of the input information data, and allows the application program to execute the preliminarily allocated process corresponding to the input information data indicating the end of the input reception by the input unit when the input unit does not receive the input information data indicating the end of the input reception by the input unit until an elapse of the predetermined time, and finishes detection of the input information data by generating a signal indicating the end of the input reception by the input unit to be transmitted to the input detection unit.

In another aspect of the present invention, there is also provided a mobile terminal device comprising:

an input unit configured to receive an input;

an input detection unit activated at a time when the input unit receives the input to detect an input information data including at least an input state indicating the input received by the input unit;

an application control unit configured to receive the input information data detected by the input detection unit to allow an application program to perform a process preliminarily allocated corresponding to the input information; and a timer, wherein the application control unit allows the application program to execute the preliminarily allocated process corresponding to the input information data indicating the end of the input reception by the input unit when the input by the input unit is inputted continuously by a predetermined time set by the timer.

In preferred embodiments of the above aspects, it may be desired that the mobile terminal device further include a predetermined time set table having the predetermined time set in accordance with a kind of the application program, wherein the application control unit sets the timer to the predetermined time corresponding to the application program allowed to execute the preliminarily allocated process corresponding to the input information data by referring to the predetermined time set table.

It may be desired that the mobile terminal device further include a predetermined time set table having the predetermined time set in accordance with a kind of a key of the input unit, wherein the input detection unit detects the input information data which contain the kind of the key through which the input unit receives the input, and the application control unit sets the timer to the predetermined time corresponding to the key through which the input unit receives the input by referring to the predetermined time set table.

It may be desired that the mobile terminal device further include a predetermined time set table having a predetermined time set in accordance with a display state of the application program, wherein the application program allows the timer to count the predetermined time corresponding to the display state of the application program upon execution of the preliminarily allocated process corresponding to the input information data in response to a command of the application control unit by referring to the predetermined time set table.

The mobile terminal device according to the present invention executes detection of the input state of the input unit and the control in accordance with the input state for reducing the power consumption.

The nature and the further characteristic features of the present invention will be made clearer from the following descriptions made with reference to the accompanying drawings.

BRIEF DESCRIPTION OF THE DRAWINGS

In the accompanying drawings:

FIGS. 1A and 1B show illustrated front and side views of a foldable mobile phone as an example of a mobile terminal device according to the present invention;

FIGS. 2A and 2B show illustrations of the foldable mobile phone as the example of the mobile terminal device of FIG. 1 in a folded state:

FIG. 5 shows an exemplary improper operation detection time set table referred for setting the improper operation detection time, wherein FIG. 5A shows a table of the improper operation detection time set in accordance with the kind of application, and FIG. 5B shows a table of the improper operation detection time set in accordance with an operation key kind as the input unit;

DESCRIPTION OF THE PREFERRED EMBODIMENTS

Figure 3:
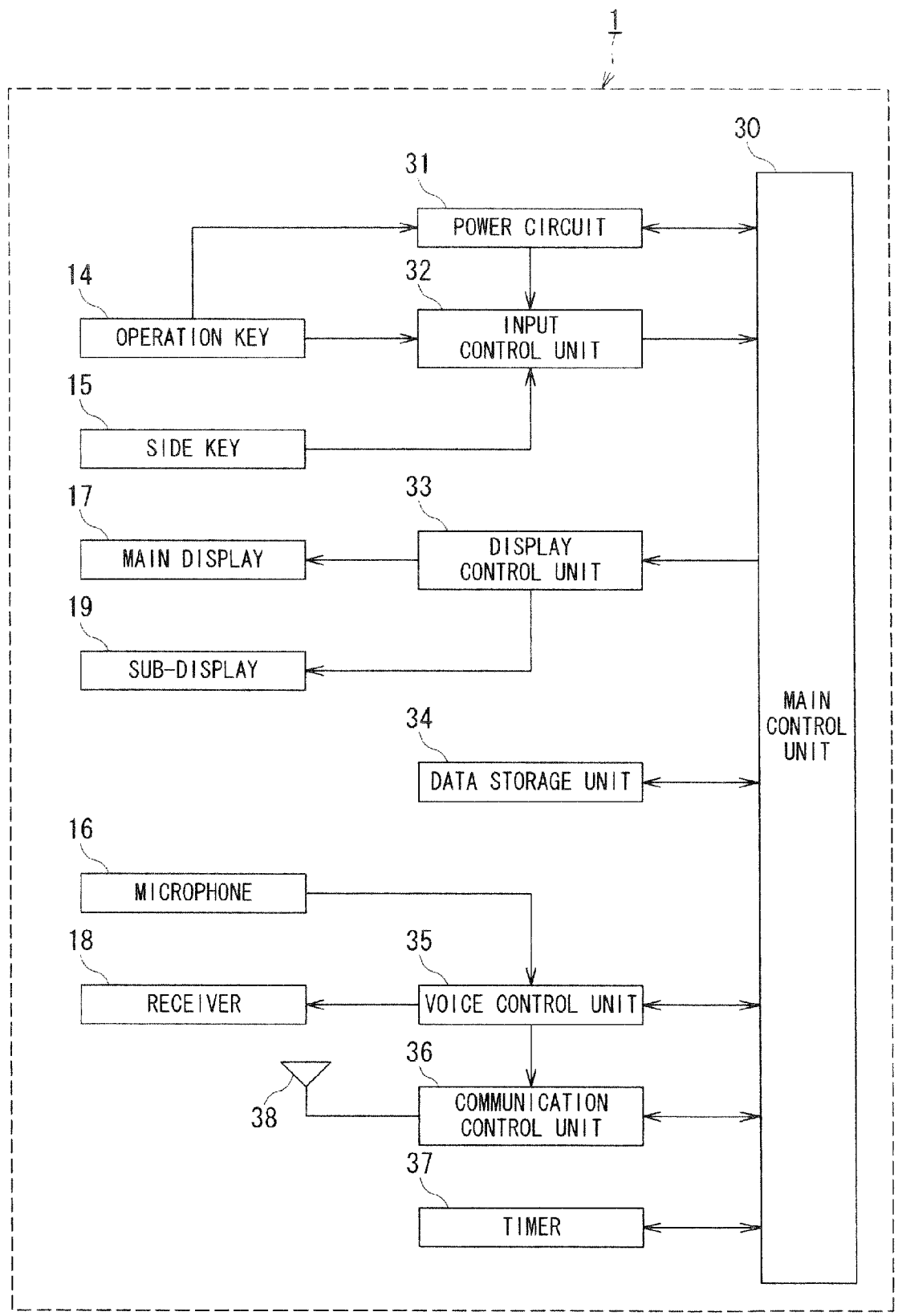
FIG. 3 is a block diagram of an inner structure of the mobile phone as the example of the mobile terminal device of FIG. 1.

An embodiment of the mobile terminal device according to the present invention will be described with reference to the accompanying drawings.

FIG. 1A is a front view of the mobile phone 1 which is opened at substantially 180°, and FIG. 1B is a side view of the mobile phone 1 in the open state.

Referring to FIGS. 1A and 1B, the mobile phone 1 includes a first casing 12 and a second casing 13 which are connected by means of a center hinge portion 11 so as to realize the structure foldable in an arrow direction X. An antenna for signal transmission/reception is installed at a predetermined position inside the mobile phone 1. The mobile phone 1 communicates the electric wave with a base station (not shown) via the built-in antenna.

The first casing 12 is provided with operation keys 14 such as numeric keys from "0" to "9", a call key, a redial key, an end/power key, a clear key, and a menu key on the surface, through which various commands are inputted.

The first casing 12 is further provided with an arrow key and a return key each as the operation key 14 at the upper portion. The user operates the arrow key vertically or laterally so as to move the cursor in the corresponding direction. Specifically, through the operation keys, various operations for scrolling list of the address book, e-mail, and simplified homepage on a main display 17 of the second casing 13, and forwarding images will be executed.

The return key is depressed to establish various functions. For example, when the user selects the desired phone number among those listed in the address book displayed on the main display 17 through the operation of the arrow key, and depresses the return key on the first casing 12, the phone call is made to the selected number.

The first casing 12 is further provided with a menu key to the right of the arrow key and return key. When the menu key on the first casing 12 is depressed, the menu selection screen is turned ON.

The first casing 12 includes a side key 15 for operating the mobile phone 1, which is depressed when the mobile phone 1 is opened and closed to execute the respectively allocated processes.

The first casing 12 includes a microphone 16 disposed below the operation keys 14 for collecting the user's voice over the phone.

The first casing 12 further includes a battery pack (not shown) at the back side. When the end/power key is brought into ON state, the electric power is supplied to the respective circuits from the battery pack so as to be brought into the operable state.

On the other hand, the second casing 13 includes the main display 17 on the front surface. The main display 17 may be formed of an LCD (Liquid Crystal Display), an organic EL (Electro Luminescence) display, an inorganic EL display, and an SED (Surface-conduction Electron-emitter Display).

The main display 17 displays the reception state of the electric wave, the remaining battery level, addressee's name, phone number registered in the address book, transmission record, and text of the e-mail and contents received from the simplified homepage and the external contents server (not shown).

A receiver 18 is formed at a predetermined position above the main display 17 to allow the user to talk with the addressee. The mobile phone 1 is provided with a speaker (not shown) as a voice output portion other than the receiver 18 at a predetermined position.

FIG. 2 shows the foldable mobile phone 1 in a state of being folded in the arrow X direction from the state shown in FIG. 1 such that the first casing 12 and the second casing 13 substantially overlap with each other through the hinged portion.

A sub-display 19 formed of an LCD, for example, is disposed on the second casing 13 for displaying pictographs of the antenna representing the current sensitivity level, the battery representing the remaining level of the battery of the mobile phone 1, and the current time.

FIG. 3 is an illustration of a structure inside the mobile phone 1 according to the embodiment of FIG. 1.

With reference to FIG. 3, in the mobile phone 1, a main control unit 30, a power circuit 31, an input control unit 32, a display control unit 33, a data storage unit 34, a voice control unit 35, a communication control unit 36, and a timer 37 are connected with one another via bus so as to allow mutual communication.

The main control unit 30 includes a CPU which generates various control signals so as to be supplied to the respective components for centrally controlling the mobile phone 1. The CPU executes the input control with respect to the input received from the operation keys 14, or other calculations and control operations.

The power circuit 31 switches the ON/OFF state of the power source based on the input received through the operation keys 14 operated by the user. When the power source is in ON state, power is supplied to the respective components from the power supply (battery) to bring the mobile phone 1 operable.

The input control unit 32 includes an input interface for the operation keys 14 and the side key 15. Upon depression of the operation keys 14 and the side key 15, the input control unit 32 generates a signal corresponding to the depressed operation key 14 or side key 15 so as to be transmitted to the main control unit 30.

The display control unit 33 includes a display interface for the main display 17 and the sub-display 19. The display information which contains text and image is displayed on the main display 17 and the sub-display 19 under the control of the main control unit 30.

The data storage unit 34 includes a ROM, a hard disk, and a non-volatile memory for storing the process program executed by the main control unit 30 and the data required for the process, and a RAM which temporarily stores data used by the main control unit 30 for processing.

The data storage unit 34 stores various kinds of application executed by the CPU of the main control unit 30 and various data sets. A key detection unit, a middleware, an application control unit and the corresponding applications are realized by the program stored in the data storage unit 34.

The voice control unit 35 generates an analog voice signal from the voice collected by the microphone 16 under the control of the main control unit 30, and converts the analog voice signal into a digital voice signal. When the digital voice signal is obtained, the voice control unit 35 converts the digital voice signal into the analog voice signal under the control of the main control unit 30 so as to be outputted from the receiver 18 as voice.

The communication control unit 36 subjects the reception signal received from the base station (not shown) through the antenna 38 to a spectrum inverse diffusion process to decompress the data under the control of the main control unit 30. The data may be transmitted to the voice control unit 35 to be outputted from the receiver 18, transmitted to the display control unit 33 to be displayed on the main display 17, or stored in the data storage unit 34 in response to the command of the main control unit 30.

When the voice data collected by the microphone 16, the data inputted through the operation key 14, and the data stored in the data storage unit 34 are obtained under the control of the main control unit 30, the communication control unit 36 subjects those data to the spectrum diffusion process to be transmitted to the base station via the antenna 38.

The timer 37 counts a predetermined interval and a predetermined time as necessary to transmit the signal upon elapse of the predetermined interval and the predetermined time for notifying the user of time out. In the embodiment, the predetermined interval for detection of the input unit or the time out of the improper operation detection time will be notified.

Figure 4:
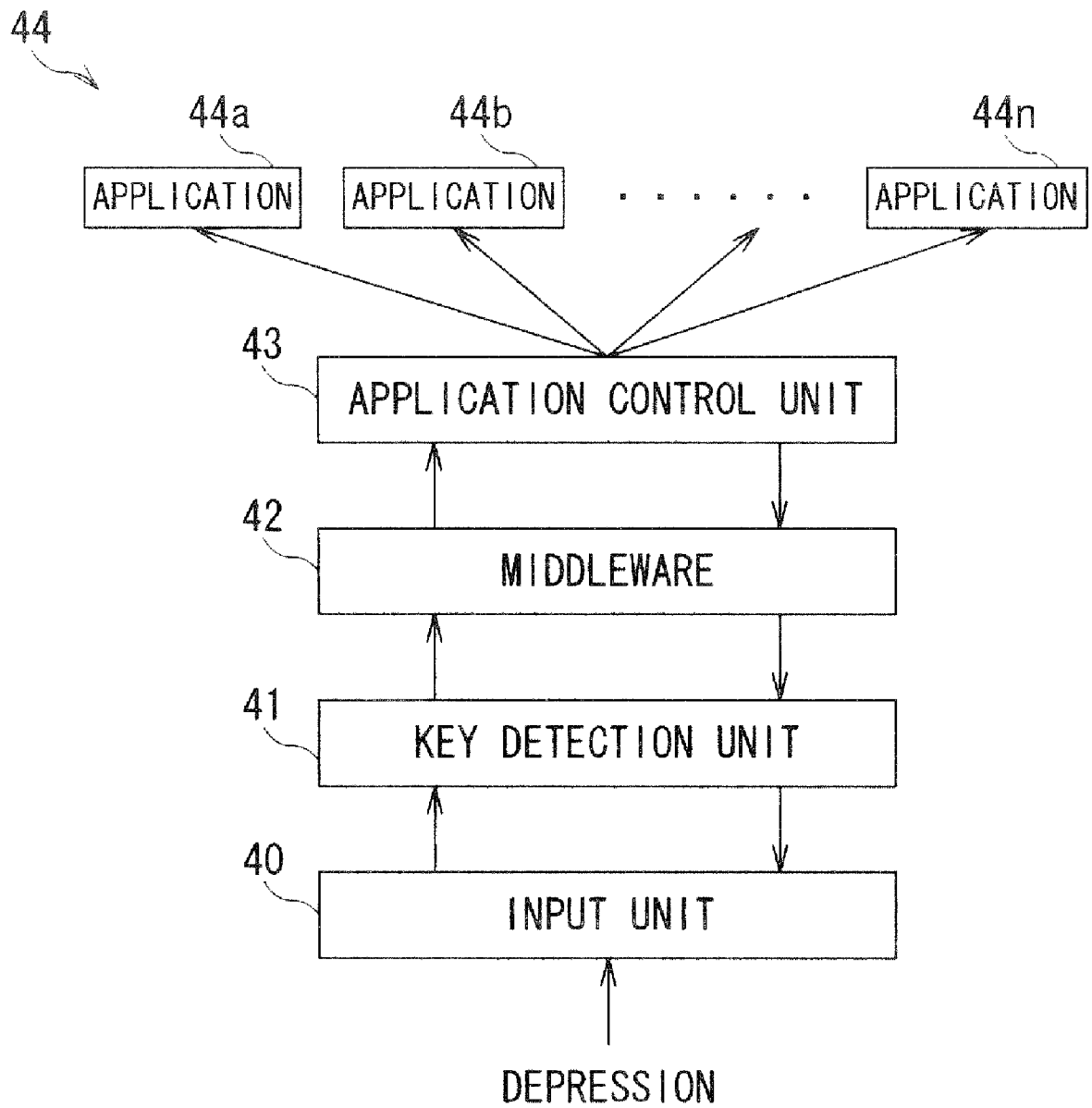
FIG. 4 is an explanatory view schematically showing a software structure of the mobile phone according to the embodiment.

FIG. 4 is an explanatory view schematically showing the structure of the mobile phone 1 according to the preferred embodiment of the present invention.

An input unit 40 is composed of the operation keys 14 and the side key 15, and receives the input upon depression of the operation keys 14. Each of the operation keys 14 and the side key 15 has a function executed when the corresponding key is depressed. The processes executed by the "long depression" and the "short depression" set in accordance with the length of time for depressing the key may be different. The "short depression" denotes the case where the time taken for the continuous input is shorter than the predetermined value (alternatively, the number of times of continuous detection of input performed each at a predetermined interval is smaller than a predetermined number of times). The "long depression" denotes the case where the time taken for the continuous input is equal to or longer than the predetermined time (alternatively, the number of times of the continuous detection of input performed each at a predetermined interval is larger than that of the "short depression" case).

A key detection unit 41 is activated when the input unit 40 receives the input to detect the input state of the input unit 40, and performs the detection with respect to the input unit 40 until the end of the input reception. The key detection unit 41 detects the state where the input unit 40 receives the input, and the state in transition from the input reception to the input cancellation.

The input state in the embodiment includes "Press state" and "Release state". The "Press state" denotes the state where the operation key 14 is depressed to allow the input unit 40 to receive the input. The "Release state" denotes the transition from the "Press state" to the state where the input reception of the input unit 40 is finished when the operation key 14 is no longer depressed.

The key detection unit 41 detects with respect to depression of the key of the operation keys 14 and the side key 15 as the input unit 40. The key detection unit 41 detects the input state of the input unit 40, and kind of the operation key 14 and the side key 15 which have been depressed as the input information.

When it is detected that the input unit 40 is in "Press state", the key detection unit 41 detects the input information of the input unit 40 at a predetermined interval in response to the signal obtained by the timer 37 at several tens to several hundreds intervals. The detection is performed repeatedly at a predetermined interval until the input unit 40 is detected as being released from the "Press state", i.e., "Release state".

The key detection unit 41 transmits the input information of the detected input to the middleware 42.

The middleware 42 provides the input information with respect to the input detected by the key detection unit 41 to an application control unit 43. The provision of the input information to the application control unit 43 is repeatedly executed at a predetermined interval until the input unit 40 is detected as being released from the "Press state", i.e., "Release state".

The application control unit 43 transmits the signal to the respective applications 44 based on the input information provided from the middleware 42 for totally controlling the applications 44. Specifically, based on the input information received via the input unit 40 and supplied via the key detection unit 41 and the middleware 42 sequentially, the predetermined process preliminarily allocated to one or more applications 44 will be executed.

The application control unit 43 allows the application 44 to execute the predetermined process based not only on the input information provided from the middleware 42 but also on the signal generated by itself. Specifically, even if the "Release state" is not detected from the middleware 42, the application 44 is forced to execute the allocated process upon detection of the "Release state".

When the input unit 40 is in the "Press state", the application control unit 43 transmits the signal requiring cancelation of the "Press state" to the middleware 42, and brings the middleware 42 to forcibly cancel the "Press state". The signal requiring cancellation of the "Press state" transmitted to the middleware 42 is further transmitted to the key detection unit 41 through the middleware 42.

When the input unit 40 starts to receive the input so as to detect the input information via the middleware 42, the application control unit 43 sets the timer to "n" seconds as the improper operation detection time. The improper operation detection time is referred to allow determination with respect to the improper operation when the "Press state" has been continued.

The timer 37 counts the time until the elapse of "n" seconds of the improper operation detection time based on the command of the application control unit 43. When the "n" seconds elapses, the timer 37 sends the timeout notice to the application control unit 43.

FIG. 5 shows an exemplary improper operation detection time set table which will be referred to for setting the improper operation detection time by the application control unit 43. FIG. 5A is a table of the improper operation detection time set in accordance with the kind of the application 44. FIG. 5B is a table of the improper operation detection time set in accordance with the kind of the operation key 14 as the input unit 40.

Referring to FIG. 5A, when the improper operation detection time is set in accordance with the kind of the application 44, for example, the standby application, Web browser application, mail application, and camera application, it may be set depending on presence/absence of the process preliminarily allocated to the "long depression".

In the case where the scroll operation on the display is allocated to the "long depression" on such application 44 as the Web browser application and the mail application, the improper operation detection time is set to 30 seconds. In the case where the predetermined process is not allocated to the "long depression" on such application 44 as the standby application and the camera application, the shorter improper operation detection time of 10 seconds may be set.

Referring to FIG. 5B, when the improper operation detection time is set in accordance with the kind of the operation key 14, for example, menu key, arrow key, numeric key, the improper operation detection time may be set depending on presence/absence of the process preliminarily allocated to the "long depression".

In the case where the "long depression" corresponds to the frequently used display scroll operation on the operation key 14, the improper detection time is set to 30 seconds. In the case where the "long depression" corresponds to the less frequently used operation key 14, the improper operation detection time may be set to be shorter.

The aforementioned improper operation detection time set tables are stored in the data storage unit 34, which will be referred to by the application control unit 43 to set the improper operation detection time. The improper operation detection time set table may be structured to change the time to the arbitrary value.

The application 44 includes various kinds executed by the CPU (applications 44a to 44n). The mobile phone 1 may be provided with various applications 44, for example, the mail application, the Web browser application, the standby application, and the address book application. The application 44 is activated by the signal supplied from the application control unit 43 so as to execute various kinds of process.

Various applications executed by the CPU may be preliminarily installed in the data storage unit 34 through downloading to the mobile phone 1 with communication via the base station (not shown).

A plurality of applications 44 may be simultaneously activated. In the aforementioned case, one of those applications 44 is constantly activated, and the other applications 44 are kept inactive. The active one of the plural applications 44 is displayed on the main display 17. The application control unit 43 acts to recognize that the input information received via the input unit 40, the key detection unit 41 and the middleware 42 sequentially is the one transmitted to the active application 44, and transmits the signal to the active application 44 for executing the predetermined process.

The plural applications 44 in activated states may be switched with one another. Upon the switching operation, the menu key of the operation key 14 is depressed to display the selection screen of the applications 44 so that the desired application 44 is switched into the active state.

The generally employed input control process will be described.

The key detection unit detects the "Press state" where the input unit receives the input, and transmits the detected "Press state" to the middleware and the application control unit sequentially. The application control unit allows the application to execute the predetermined process in accordance with the received "Press state". Upon reception of the "Press state", the application control unit allows the application to execute the corresponding process repeatedly unless the "Press state" is canceled, and the signal indicating the input unit in "Release state" is transmitted via the key detection unit and the middleware sequentially.

In the case where the operation key as the input unit is accidentally kept depressed owing to the improper operation, the application control unit allows the application to execute the predetermined process repeatedly in accordance with the "Press state". While the "Press state" is continued, the key detection unit, the event control unit and the application control unit detect the "Release state" at predetermined intervals, resulting in increased power consumption.

In the mobile phone 1 according to the present embodiment, when the duration of the "Press state" of the input unit 40 elapses by a predetermined time, the application control unit 43 forcibly generates the signal indicating that the input unit is in the "Release state" so as to be supplied to the respective components. This makes it possible to avoid unnecessary increase in the power consumption.

An input control process executed by the application control unit 43 in the mobile phone 1 according to the embodiment will be described with reference to FIG. 6 which is a flowchart of the input control process executed by the application control unit 43.

In the input control process executed by the application control unit 43 according to the present embodiment, the Web browser application is started upon the command of the application control unit 43 so as to be brought into the active state.

The input information used for the input control process contains the input state of the input unit 40 detected by the key detection unit 41, and the kind of the operation keys 14. The input state may be used as the information indicating whether the input unit 40 is in the "Press state" or the "Release state".

In step S1, the application control unit 43 determines whether or not the "Press state" is detected. When the "Press state" is detected, the control process after "Press state" detection starts. The determination with respect to presence/absence of detection of the "Press state" may be made by starting the input in accordance with the depression of the operation key 14 as the input unit 40, and determining whether or not the application control unit 43 detects the "Press state" detected by the key detection unit 41 and transmitted via the middleware 42. For example, the operation key 14 is depressed to the active Web browser application, and the signal indicating the reception of the process is transmitted via the key detection unit 41 and the middleware 42, based on which it is determined whether or not the application control unit 43 detects the received process.

Upon detection of the "Press state", the application control unit 43 sets the timer to "n" seconds as the improper operation detection time. The timer 37 counts the time until the elapse of "n" seconds. When the time elapses "n" seconds, the timeout notice is transmitted to the application control unit 43. The application control unit 43 then sets the improper operation detection time by referring to the improper operation detection time set table shown in FIG. 5 which is stored in the data storage unit 34.

When the Web browser application is active, the application control unit 43 refers to the improper operation detection time table set in accordance with the kind of the application 44 shown in FIG. 5A, and sets the timer 37 to 30 seconds as the improper operation detection time corresponding to the Web browser application.

When the arrow key of the operation key 14 is depressed, the improper operation detection time table set in accordance with the kind of the operation key 14 shown in FIG. 5B is referred to, and the timer 37 is set to 30 seconds as the improper operation detection time corresponding to the depressed arrow key.

The improper operation detection time tables set in accordance with the kind of the application 44 and the kind of the operation key 14, respectively, may be referred to individually, or in combination. Besides the kinds of the application 44 and operation key 14, the constant value may be used as the improper operation detection time.

In step S3, the currently active application 44 is allowed to execute the preliminarily allocated process based on the input information received via the input unit 40. When the arrow key of the operation key 14 to which the scrolling with respect to the simplified homepage on the main display 17 is allocated, the application control unit 43 allows the active Web browser application to execute the allocated process in response to the detected "Press state" and depression of the arrow key. The Web browser application then performs the scrolling on the screen downward corresponding to the process allocated to the arrow key.

The key detection unit 41 detects with respect to the state of the input unit 40 at a predetermined interval at several tens to several hundreds seconds from the timing when the input unit 40 starts receiving input to detect the "Press state" until the timing when the end of the input reception to release the "Press state".

In step S4, the application control unit 43 determines whether or not the "Release state" has been detected. The determination is made when the input unit 40 finishes receiving the input and the "Release state" is detected by the key detection unit 41 such that it is determined whether or not the application control unit 43 detects the "Release state" transmitted via the middleware 24.

Upon detection of the "Release state", the application control unit 43 sends the command to the timer 37 to release the set timer in step S5. The application control unit 43 allows the currently active application 44 to execute the preliminarily allocated process based on the input information received via the input unit 40.

When the Web browser application 44 is allowed to scroll with respect to the simplified homepage information repeatedly based on the detection of the "Press state" in response to depression of the arrow key of the operation key 14, the application control unit 43 commands the Web browser application to stop scrolling as the process allocated to the arrow key. The Web browser application then stops scrolling on the screen in the direction corresponding to the depressed arrow key.

The key detection unit 41 stops the detection process with respect to the input unit 40 performed at constant interval after detection of the "Release state" so as to finish the input control process executed by the application control unit 43.

When it is determined that the "Release state" has not been detected in step S4, the process proceeds to step S6 in which the application control unit 43 determines with respect to the timeout of the timer set in step S2. When it is determined that no timeout occurs in the timer set in step S2, the process in step S3 is executed (the currently active application 44 is allowed to execute the preliminarily allocated process based on the input information received through the input unit 40).

When it is determined that timeout occurs in the timer set in step S2, the process proceeds to step S7 where the signal requiring cancellation of the "Press state" is transmitted to the middleware 42. The middleware 42 transmits the signal requiring cancellation of the "Press state" to the key detection unit 41. Upon reception of the signal for cancellation of the "Press state", the key detection unit 41 finishes the detection executed at a predetermined interval.

Likewise the process in Release execution step S5, the application control unit 43 allows the currently active application 44 to execute the preliminarily allocated process based on the input information received via the input unit 40 in step S8. For example, the scrolling allocated to the arrow key on the Web browser application is stopped to finish the input control process.

When the improper operation detection time in the "Press state" of the input unit 40 elapses, the application control unit 43 determines the input as the improper operation, and then forcibly causes the key detection unit 41 to stop the detection with respect to the input state. This may avoid unnecessary detection of the input state executed by the key detection unit 41 and the middleware 42, thus suppressing the power consumption of the mobile phone 1.

The application 44 is allowed to execute the predetermined process repeatedly when the "Press state" caused by the improper operation is continued. Since the application control unit 43 forcibly causes the application to execute the process allocated in the "Release state", the unnecessary process executed by the application 44 may be avoided, thus suppressing the power consumption of the mobile phone 1. For example, unnecessary scrolling on the display, or turning ON of the back-light of the main display 17 and the sub-display 19 may be avoided.

The application control unit 43 sets the improper operation detection time in accordance with the kind of the application 44, and the kind of the depressed operation key 14 or the side key 15 so as to appropriately determine with respect to the improper operation. This may reduce the chance of erroneously recognizing the "long depression" as the improper operation to improve operability for the user. The improper operation detection time for the currently active application 44 is appropriately set in accordance with the currently performed operation to further improve operability for the user.

In the described embodiment, the improper operation detection time is set by referring to the improper operation detection time set tables set in accordance with the kinds of the application 44 and the operation keys 14, respectively. However, the improper operation detection time may be set under the other set condition. It may be set in accordance with the display screen (scene) as the display state of the application 44 which has been executed upon start of input reception.

When the improper operation detection time is set in accordance with the display screen of the application 44 on the main display 17, the application 44 active upon start of the input reception sets the timer 37 by referring to the improper operation detection time set table stored in the data storage unit 34.

Figures 6, 7:
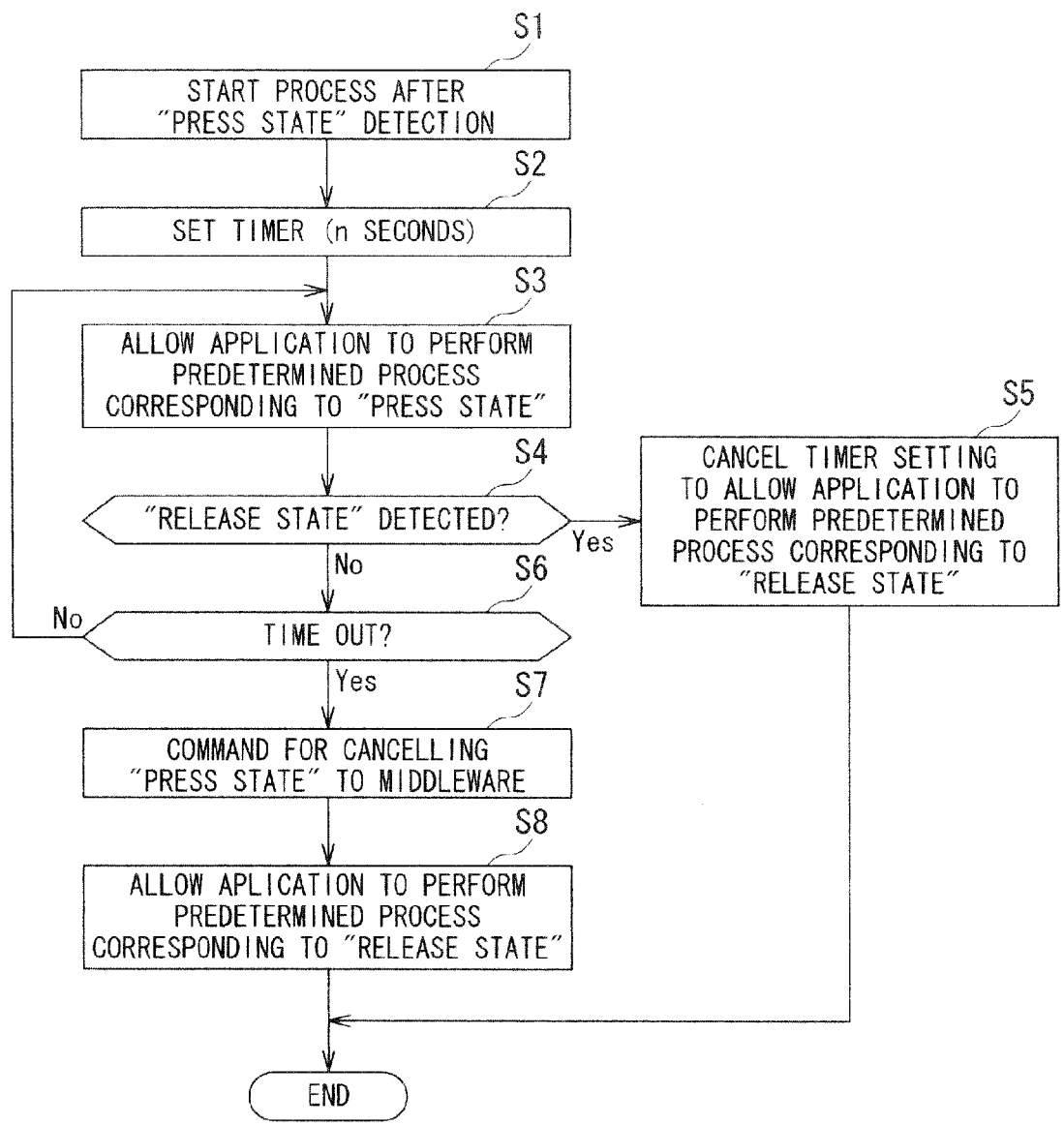
FIG. 6 is a flowchart representing an input control process executed by an application control unit.
FIG. 7 shows a table of an improper operation detection time set in accordance with the kind of operation of Web browser application referred when setting the improper operation detection time.

FIG. 7 is an exemplary improper operation detection time set table set in accordance with the kind of the operation of the Web browser application.

Referring to FIG. 7, on the Web browser application screen, the improper operation detection time for the Web browser application is set to 30 seconds with respect to the homepage display to which such operation as scrolling of the display is allocated. The improper operation detection time may be set as short as 10 seconds for the starting screen or connection screen to which the specific processing such as the scrolling on the screen is not allocated.

When the improper operation detection time elapses, the timeout notice is transmitted from the timer 37 to the application control unit 43, and the subsequent process is executed in the same manner as in the input control process.

In the described embodiment, although the middleware 42 and the application control unit 43 shown in FIG. 4 are provided individually, the respective components may be executed by the single software program.

The determination whether or not the input received through the input unit 40 is made on the basis of the elapse of the set improper operation detection time. The improper operation may be determined when the number of times of continuous detection with respect to the "Press state" by the key detection unit 41 becomes predetermined value or more.

Besides the mobile phone 1, the mobile terminal device may be formed as PDA, personal computer, mobile game machine, mobile music player, mobile video player and other kinds of the mobile terminal devices.

The series of the process in the described embodiment may be executed by either software or hardware.

Furthermore, in the above embodiment, although the steps in the flowchart are executed sequentially in time series as described, it is not always necessary for them to be executed in time series, and they may be executed simultaneously or individually.

What is claimed is:

1. A mobile terminal device comprising:
an input unit configured to receive an input through a key;
an input detection unit activated at a time when the input unit receives the input through the key to detect an input information data including at least an input state indicating the input received by the input unit until end of the input reception by the input unit;
an application control unit configured to receive the input information data detected by the input detection unit to allow an application program to perform a process preliminarily allocated corresponding to the input information; and
a timer that counts a predetermined set time, wherein
the application control unit allows the timer to count a predetermined time upon reception of the input information data, and allows the application program to execute the preliminarily allocated process corresponding to the input information data indicating the end of the input reception by the input unit when the input unit does not receive the input information data indicating the end of the input reception by the input unit until an elapse of the predetermined time, and finishes detection of the input information data by generating a signal indicating the end of the input reception by the input unit to be transmitted to the input detection unit.

2. The mobile terminal device according to claim 1, further comprising a predetermined time set table having the predetermined time set in accordance with a kind of the application program, wherein the application control unit sets the timer to the predetermined time corresponding to the application program allowed to execute the preliminarily allocated process corresponding to the input information data by referring to the predetermined time set table.

3. The mobile terminal device according to claim 1, further comprising a predetermined time set table having the predetermined time set in accordance with a kind of a key of the input unit, wherein the input detection unit detects the input information data which contain the kind of the key through which the input unit receives the input, and the application control unit sets the timer to the predetermined time corresponding to the key through which the input unit receives the input by referring to the predetermined time set table.

4. The mobile terminal device according to claim 1, further comprising a predetermined time set table having a predetermined time set in accordance with a display state of the application program, wherein the application program allows the timer to count the predetermined time corresponding to the display state of the application program upon execution of the preliminarily allocated process corresponding to the input information data in response to a command of the application control unit by referring to the predetermined time set table.

5. A mobile terminal device comprising:
an input unit configured to receive an input;
an input detection unit activated at a time when the input unit receives the input to detect an input information data including at least an input state indicating the input received by the input unit;
an application control unit configured to receive the input information data detected by the input detection unit to allow an application program to perform a process preliminarily allocated corresponding to the input information; and
a timer, wherein
the application control unit allows the application program to execute the preliminarily allocated process corresponding to the input information data indicating the end of the input reception by the input unit when the input by the input unit is inputted continuously by a predetermined time set by the timer.

6. The mobile terminal device according to claim 5, further comprising a predetermined time set table having the predetermined time set in accordance with a kind of the application program, wherein the application control unit sets the timer to the predetermined time corresponding to the application program allowed to execute the preliminarily allocated process corresponding to the input information data by referring to the predetermined time set table.

7. The mobile terminal device according to claim 5, further comprising a predetermined time set table having the predetermined time set in accordance with a kind of a key of the input unit, wherein the input detection unit detects the input information data which contain the kind of the key through which the input unit receives the input, and the application control unit sets the timer to the predetermined time corresponding to the key through which the input unit receives the input by referring to the predetermined time set table.

8. The mobile terminal device according to claim 5, further comprising a predetermined time set table having a predetermined time set in accordance with a display state of the application program, wherein the application program allows the timer to count the predetermined time corresponding to the display state of the application program upon execution of the preliminarily allocated process corresponding to the input information data in response to a command of the application control unit by referring to the predetermined time set table.

* * * * *